US009043313B2

(12) United States Patent
Kumar

(10) Patent No.: US 9,043,313 B2
(45) Date of Patent: May 26, 2015

(54) SYSTEM AND/OR METHOD FOR PERSONALIZATION OF SEARCHES

(75) Inventor: Amit Kumar, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 817 days.

(21) Appl. No.: 12/039,419

(22) Filed: Feb. 28, 2008

(65) Prior Publication Data

US 2009/0222431 A1  Sep. 3, 2009

(51) Int. Cl.
G06F 7/00  (2006.01)
G06F 17/30  (2006.01)

(52) U.S. Cl.
CPC ................. G06F 17/30867 (2013.01)

(58) Field of Classification Search
CPC .............. G06F 17/30864; G06F 17/3087
USPC ........... 707/721, 732; 715/732, 764, 797, 809
See application file for complete search history.

(56) References Cited

U.S. PATENT DOCUMENTS

| 6,006,217 | A  | * | 12/1999 | Lumsden ............................ 1/1 |
| 6,047,327 | A  | * | 4/2000  | Tso et al. ...................... 709/232 |
| 6,182,068 | B1 | * | 1/2001  | Culliss ................... 707/999.005 |
| 8,370,372 | B2 | * | 2/2013  | Jones et al. .................... 707/758 |
| 2002/0157095 | A1 | * | 10/2002 | Masumitsu et al. ............ 725/46 |
| 2004/0059712 | A1 | * | 3/2004  | Dean et al. ........................ 707/1 |
| 2004/0088328 | A1 | * | 5/2004  | Cook et al. ................. 707/104.1 |
| 2004/0167928 | A1 | * | 8/2004  | Anderson et al. .......... 707/104.1 |
| 2004/0249983 | A1 | * | 12/2004 | Bedner ......................... 709/249 |
| 2006/0224583 | A1 | * | 10/2006 | Fikes et al. ........................ 707/6 |
| 2007/0061195 | A1 | * | 3/2007  | Liu et al. .......................... 705/14 |
| 2008/0288480 | A1 | * | 11/2008 | Yahia et al. ........................ 707/5 |

* cited by examiner

Primary Examiner — Cheyne D Ly
(74) Attorney, Agent, or Firm — Berkeley Law & Technology Group, LLP

(57) ABSTRACT

The subject matter disclosed herein relates to a system and/or method for providing enhanced content search results based on metrics indicating user affinity for an information site such as a web site. Information on user visits to a particular web site may be accumulated, for example, in connection with a beacon or other tracker placed on the publisher web site. The enhanced content may be provided by the publisher web site or may be generated otherwise.

24 Claims, 4 Drawing Sheets

FIG. 2

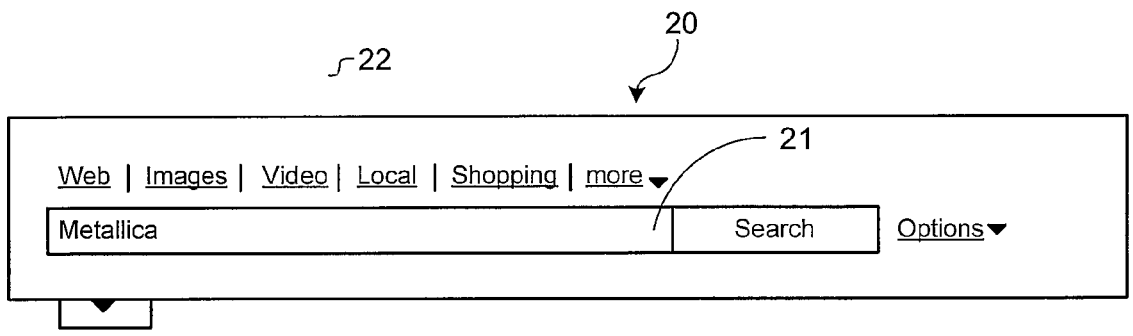

Metallica ⌒22
Official site for Metallica, the heavy metal band consisting of James Hetfield, Lars Ulrich, Kirk Hammett, and Robert Trujilio. With tour info, news, merchandise, ...
Www.metallica.com   - 34k - Cached 23
Metallica – Wikipedia, the free encyclopedia
History and profile of Metallica, one of America's most famous heavy metal bands, Covers Metallica's formation and early music, former members, discography, trivia, ...
Quick Links: History – Early days (1981-1983) – Kill 'Em All and Ride the Lighting (1983-1984)
En.wikipedia.org/wiki/Metallica    - 208k - Cached 24
ENCYCLOPEDIA METALLICA – For fans, by fans.
Online collection of all things Metallica. Find band news, tour dates, trivia, photo archive, and song tablature. With band member bios, a Metallica dictionary, and ...
Www.encvcmet.com   - 19k - Cached 25
Metallica – MySpace
Official MySpace page for Metallic, with streaming songs, tour dates, and news.
www.myspace.com/metallica   - 181k - Cached 26
Amazon.com: Metallica: Music: Metallica
... .com: Metallica: Music: Metallica by ... out the selection of Metallica DVDs in our Music ... to its monochrome cover), Metallica marks the group's entrance ...
www.amazon.com/Metallica/dp/B000002H97   - 245k - Cached 27
Metallica – Atlantic Records
Official label site for Metallica from Atlantic Records.
www.atlanticrecords.com/metallica   - 40k - Cached

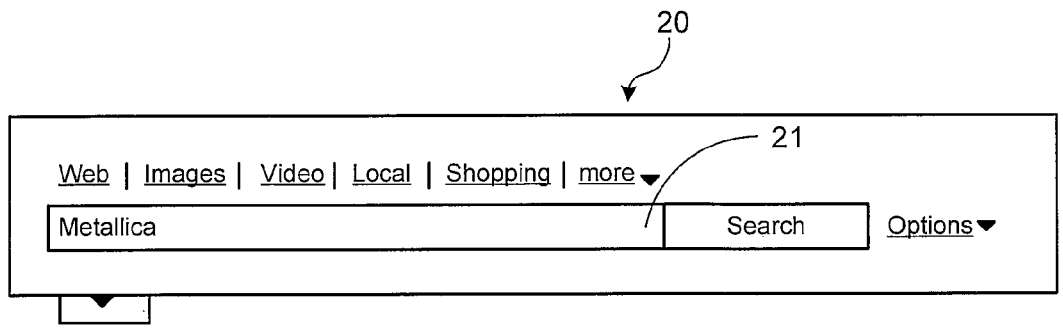

Metallica — 22
Metallica
Official site for Metallica, the heavy metal band consisting of James Hetfield, Lars Ulrich, Kirk Hammett, and Robert Trujilio. With tour info, news, merchandise, ...
Www.metallica.com  - 34k - Cached 23
Metallica – Wikipedia, the free encyclopedia
History and profile of Metallica, one of America's most famous heavy metal bands, Covers Metallica's formation and early music, former members, discography, trivia, ...
Quick Links: History – Early days (1981-1983) – Kill 'Em All and Ride the Lighting (1983-1984)
En.wikipedia.org/wiki/Metallica   - 208k - Cached 24
4.   ENCYCLOPEDIA METALLICA – For fans, by fans.
Online collection of all things Metallica. Find band news, tour dates, trivia, photo archive, and song tablature. With band member bios, a Metallica dictionary, and ...
Www.encycmet.com  - 19k - Cached

Metallica — 25

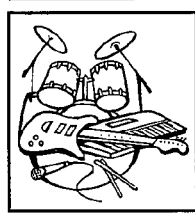

Listen now! — 32
Send message
Add profile — 33
                     34

Genre: Metal / Rock — 31
Location: CALIFORNIA
Profile views: 10769760
Friends: 749643 www.encycmet.com   19k - Cached

26
Amazon.com: Metallica: Music: Metallica
... .com: Metallica: Music: Metallica by ... out the selection of Metallica DVDs in our Music ... to its monochrome cover), Metallica marks the group's entrance ...
www.amazon.com/Metallica/dp/B000002H97  - 245k - Cached

SYSTEM AND/OR METHOD FOR PERSONALIZATION OF SEARCHES

BACKGROUND

1. Field

The subject matter disclosed herein relates to personalization of computerized searches.

2. Information

Search engines such as the Yahoo! and Google search engines commonly receive search queries from users and provide search results in response to the queries.

Users may become inured to, or hostile to, pop-ups, pop-under, banner and other advertising, notices and other kinds of information that is placed before them on a repetitive basis. On the other hand, they may find the volume of offerings from disparate sources that may be located by a search engine to be daunting. Many users, of course, have sites that they prefer to visit. For example, a user may prefer to make purchases from the Amazon.com web site as opposed to myriad other sites that may sell the same or similar goods. Similarly, they may prefer a web site from the publishers of the New York Times for news and opinions, or prefer one or more of the social web sites over others. Publishers may wish to provide information to users, but may not wish to alienate a portion of the users who may react negatively, for example, viewing the information as intrusive.

BRIEF DESCRIPTION OF THE FIGURES

Non-limiting and non-exhaustive embodiments will be described with reference to the following figures, wherein like reference numerals refer to like parts throughout the various figures unless otherwise specified.

FIG. 2 is a representation of a search engine results page generated in response to a query.

FIG. 3 is a representation of a search engine results page displaying customized content.

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Unless specifically stated otherwise, as apparent from the following discussion, it is appreciated that throughout this specification discussions utilizing terms such as "processing", "computing", "calculating", "associating", "identifying", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

Many search engines and other such systems are accessible by users over an electronic communications network. This network may comprise, in whole or in part, a public network such as the Internet, a company local area network ("LAN"), wide area network ("WAN"), virtual private network ("VPN"), as well as other types of electronic telecommunications networks. The present embodiments may be discussed in connection with use of the Internet as at least a part of the electronic communications network.

In one such embodiment, enhanced content relating to a publisher web site may be provided to a user, for example, on a trial basis. The enhanced content may be displayed in response to a search engine query that results in the creation of a search engine results page on which one of the search results identifies a web page or pages on the publisher web site. The enhanced content may be displayed on a search engine results page in place of and/or in addition to the search results relating to the publisher web site along with other search results. If the user wishes to continue receiving the enhanced content for the publisher web site, an option may be given to the user to make the display of enhanced content persistent. User visits to a publisher web site may be tracked by such means as a cookie placed on the user's computer platform. A score may be computed based on user visit information to a publisher web site by the user computing platform.

Figure 1:
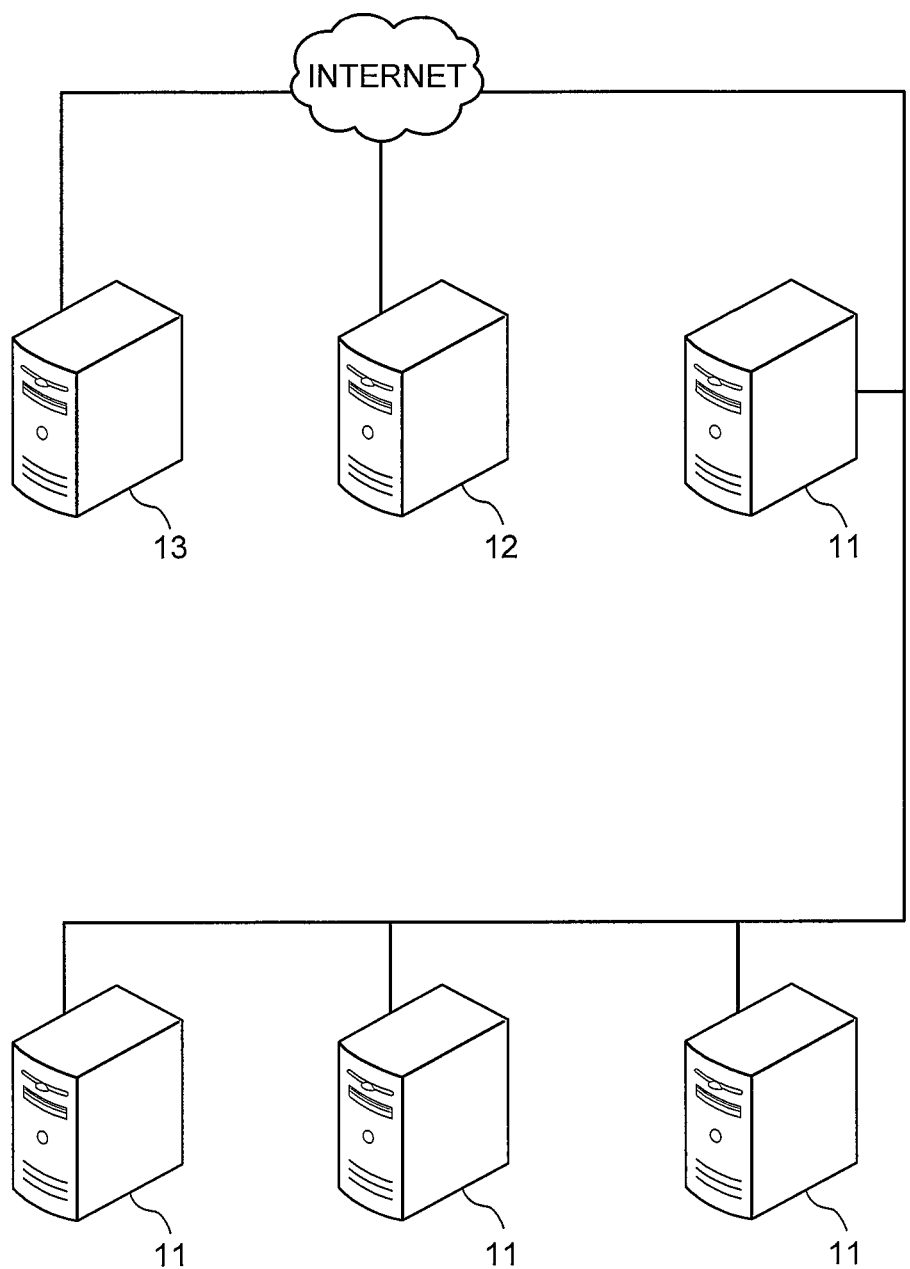
FIG. 1 is a depiction of computing platforms capable of hosting a publisher sites and a search engine site that are available over a communications network to a plurality of users.

One environment in which this embodiment may be practiced is that of an electronic communications network. Referring to FIG. 1, in this environment, an electronic communications network 10 such as the Internet may be used to provide electronic communications between a plurality of user computing platforms 11 and a server system 12. The user computing platforms 11 may include such devices as desktop computers, workstations, notebook and tablet computers, palmtop computers, cellular telephones, personal digital assistants, and other network-enabled communications devices.

In the present embodiment, user computing platforms 11 may communicate with server system 12 over the electronic communications network 10 via any of a variety of means. As examples, a user computing platform 11 may comprise a desktop computer in a corporate setting that is connected to a company LAN that, in turn, is connected to the Internet. Another user computing platform 11 may comprise a notebook computer connected by wire or wirelessly to a cable modem through which a cable Internet service provider provides access to the Internet. Yet another user computing platform 11 may comprise a web-enabled cell phone that communicates over a cellular telephone company's network that in turn is connected to the Internet.

The server system 12 may comprise a single computer platform, but may alternatively comprise a plurality of computing devices acting in concert, and connection to an electronic communications network 10 such as the Internet may be accomplished by any of a variety of known means. Browser software may be operational on the user computing platforms 11 to permit access to the server system 12 via the World Wide Web ("the Web").

Search engine software may be hosted on the server system 12 to receive and process queries that may be submitted by users via the user computing platforms 11. A plurality of publisher server systems 13 may also be accessible to user computing platforms 11 and to the server system 12 over an electronic communications network 10 such as the Internet, and the search engine software running on the server system 12 may receive queries from user computing platforms 11 and provide search engine results identifying information on one or more publisher server systems 13 in response to such queries. While any of a variety of systems and software may be used to allow users to submit queries to search engines or the like, for convenience, the following discussion will relate to search engines accessible via the Internet that can provide search engine results on a Web page, with the search engine results relating to Web pages or portions of Web pages that relate to the search query.

FIG. 2 represents a hypothetical search engine results page 20 that includes a search box 21 for inputting queries and a plurality of search results 22-27. In FIG. 2, the search query that was presented to the search engine is displayed in the search box 21. In response to the query, "metallica," several search results relating to "metallica" are displayed.

FIG. 3 represents a hypothetical search engine results page 20 with search results 22-26. This that is directed to results for the same query, "metallica," as the search engine results page 20 of FIG. 2. However, the fourth search result 25 identifying the web site "www.myspace.com/metallica" provides enhanced content as compared to the fourth entry 25 on the search engine results page of FIG. 2. In addition to providing an image 30, such as an album cover, information about the group Metallica 31, and a link 32 to audio content by the group, other links and functions 33, 34 may be provided. Links to jump pages, background information and the like might also be included in the enhanced content, and concert scheduling, ticket sales information and the like may be provided, and other information and content may be offered.

For a hypothetical news site, a search engine response may link to a single news story, but enhanced content for the news site provided in a search result might include, for example, background information, links to related stories, links to related images, video or audio content, and the like in the enhanced content. Search engine results pointing to retail sales sites might include not only the retail product identified by the search query, but also product information and/or links to product information, related products, images of products and so forth. Other types of sites may similarly lend themselves to the providing of enhanced content.

One embodiment provides a method of providing such enhanced content to selected users. According to a particular implementation, users identified to have an affinity for a particular publisher web site may be offered enhanced content in response to searches. This affinity may be identified based on information about access by the user computing platform 11 to the publisher web site. The offer of enhanced content may be on a trial or continuing basis. The enhanced content may be provided by the publisher of the related web site, or may be prepared by others, such as by an affiliate of the operator of the publisher web site or search engine site, or by parties engaged to produce the content or otherwise.

Figure 4:
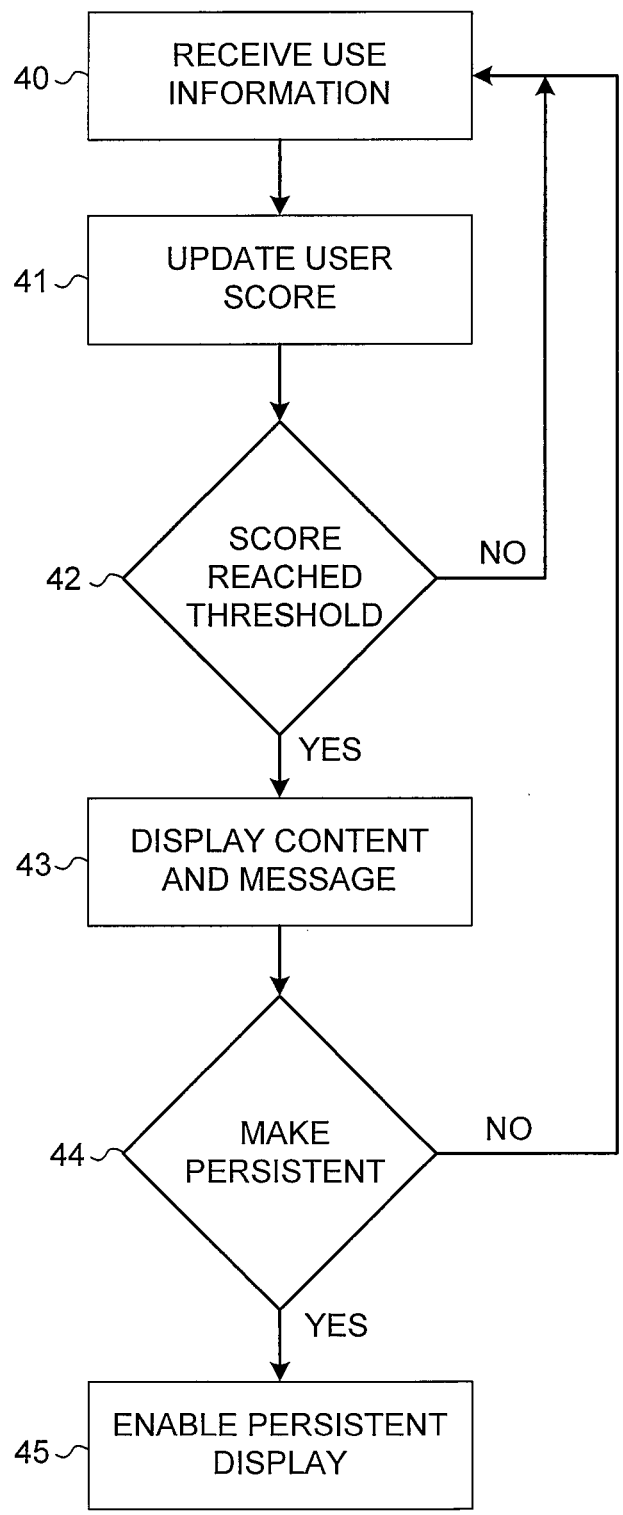
FIG. 4 is a process flow diagram for one embodiment of the present method.

As shown in the process illustrated in FIG. 4, and according to one particular embodiment, a user may have enhanced content enabled as follows. If a user visits a participating publisher web site that may, for example, be hosted on a publisher server system 13, user information (visit information) for the visit may be received at block 30 by a computing platform such as server system 12 or other associated server system. The user information (visit information) may be stored in the server system 12 or other associated server system in association with an identifier associated with the user computing platform 11. In one embodiment, a cookie may be placed on the user computing platform 11. The cookie may be used to identify the user computing platform 11, and hence, generally, the user, so that information on user visits to the participating publisher web site may be tracked, and so that the appropriate enhanced content may be displayed.

In another embodiment, a registered user of the server system 12 may have a user profile, file or the like on the server system 12 or on another associated server system with which user information may be associated.

The user information, or visit information, may be of any one of a variety of kinds and may be of a single kind or a combination of such kinds. For example, one kind of user information may include a count of visits to a web page or pages of the publisher web site. Another kind might also include an amount of time the publisher web site has been viewed by a user, the number of different publisher web site pages visited by the user, and/or other parameters and metrics associated with visits of the user to the publisher web site.

The user information may be used to update a user score at block 41. Such updating may include creation of an initial user score and/or adjusting of an existing user score to account for new user information received based on a visit by a user to the publisher web site. The score may be stored in a user profile associated, for example, with a cookie. A cookie may comprise a small tracking string or file placed on a user computing platform 11 to identify the user computing platform 11, and hence to identify the user.

The score may comprise an aggregate of received user information, or may be calculated according to a desired algorithm. For example, the score might be based, at least in part, on a total number of user visits, total number of visits decremented by a certain amount, total number of visits multiplied by the total amount of time spent on a publisher web site, total number of visits within a given time span, average amount of time a user spends on a publisher web site, number of visits over a threshold in a given time period and so forth. It should be understood, however, that these are merely examples of how such a score may be determined, and claimed subject matter is not limited in this respect.

Such a score may be decremented or otherwise adjusted based, at least in part, on the occurrence of a certain event or events, such as the providing of an offer to the user of access to the enhanced content.

In one embodiment, the transmission of user information to the server system 12 or associated server system may involve the use of a beacon or other tracker. A beacon is a set of instructions or program code that a publisher of a web site may place on its web pages. Such a beacon may be associated with an icon, graphic, button or badge, such as a badge associated with a link to a search engine web site. If a publisher web page containing a beacon or tracker is loaded onto a user computing platform 11, the instructions of the beacon may be executed. This may initiate a web browser operating on the user computing platform 11 to access the search engine web site or other associated web site, and permit the accessed web site to place a cookie or other identifier on the user computing platform 11, to refresh the cookie and/or to check for the presence of a cookie.

If such a beacon is activated as a result of a user visit to the publisher web site, the presence of the cookie may be used to identify the user (the user computing platform 11) so that user information for the user may be stored and the score may be updated.

In one embodiment, after user information has been received at block 30 based on access by the user to the publisher web site, for example, and after the score has been updated at block 41, server system 12 and/or associated server system may check whether the score has reached a threshold at diamond 42. For example, if such a threshold is twenty (i.e., for the purpose of illustration or particular example), if the score is based on visits to the publisher web site, and if the user has accessed the publisher web site twenty times, then server system 12 and/or associated server system may be set to display a message to the user when the user enters a search query into the search engine that results in an entry on the search engine results page directed to the publisher web site. If the threshold has not been reached, as determined at diamond 42, the server system 12 and/or associated server system may take no further action unless and until it receives user information at block 30, for example, from another user visit to the publisher web site.

In one embodiment, once the score has reached a threshold at block 42, the server system 12 or associated server system may be enabled to display a message. This message may be set to display a number of times as the user receives search results that include search results page entries directed to the publisher web site in block 43. For example, such a message may be displayed for the next five times the user performs searches in which one of the results relates to the publisher web site. Displays of the messages at block 43 may be accompanied by displays of the enhanced content along with the other search results, for example, on a search engine results page.

If the five displays of messages have occurred, in the present embodiment the user score may be reset to zero and no further message offering the enhanced content may be provided to the user unless and until the threshold is again reached, as determined at diamond 42. A message may indicate that enhanced search results content is available, and/or that the enhanced content is being offered on a trial basis.

The user may be given the option at block 44 to make the display of enhanced content available in, for example, search engine results pages. The user may also be presented with a button or other means to accept and/or decline the persistent enabling of enhanced content.

If the user in this embodiment clicks such a button at block 44, the server system 12 and/or associated server system may enable the display of enhanced content on a persistent basis at block 45. Such persistent enabling of enhanced content means that, irrespective of score, enhanced content may be provided each time a search result relating to the publisher web site is provided to the user as a result of the user submitting a query to the server system 12 on which the search engine is operating.

In other embodiments, one or more buttons, badges or other access mechanisms may be placed on a web page or pages on the publisher web site that provide the option for the user to select a trial of the enhanced content, that provide the option to accept the enhanced content for the publisher web site on a persistent basis and/or that allow the user to opt out of receiving any further messages or trials of the enhanced content. Provision may also be made to receive feedback on user reaction to the enhanced content, and the enhanced content may be provided on a trial basis randomly to users in order to obtain their feedback. A button or other access mechanism may be provided on the publisher web site that links to a search page of the search engine.

While there have been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

I claim:

1. A method comprising:
   determining a user score based, at least in part, on a user activity history;
   transmitting one or more electronic signals across the electronic communication network to a computing platform associated with a user at least partially in response to the user activity history, the one or more electronic signals comprising a message displayable to the user, the message to present an offer to persistently provide enhanced content to the computing platform at least partially in response to:
   determining that the user score meets or exceeds a threshold value, and
   receiving a first search query related to said enhanced content, the message to prompt the user to accept or decline the offer via one or more user selections, the enhanced content to be determined at least partially in response to identification of a particular item of the one or more search results;
   receiving user input responsive to said offer from said user at least partially in response to transmitting said one or more electronic signals comprising said message; and
   transmitting signals of at least said enhanced content for display on a client device, at least partially in response to:
   receiving an acceptance of said offer via said user input, and
   receiving a second search query from said user to be related to said enhanced content, said second search query to be received after said receiving of said acceptance of said offer.

2. The method of claim 1 further comprising modifying the user score in response to receiving a user decline of the offer.

3. The method of claim 1 wherein the user activity history comprises visit information of the user to at least one publisher site.

4. The method of claim 3 further comprising providing a beacon on the publisher web site for obtaining visit information of the at least one user.

5. The method of claim 1 wherein the search query is to be received by a search engine site via the electronic communication network, and wherein the visit information is to be maintained on at least one of said search engine site and a site associated with said search engine site.

6. The method of claim 1 further comprising offering to the user an option to enable access to the content for the publisher site irrespective of the user activity history.

7. The method of claim 3 wherein the visit information of the at least one user is to be stored on other than the publisher site.

8. The method of claim 7 wherein the visit information of the at least one user is to be stored as at least a part of a user profile.

9. The method of claim 4 wherein, in response to a visit by the at least one user to the publisher site, a site other than the publisher site is to send a tracking string to the user.

10. The method of claim 3 wherein the at least one user is a registered user of the search engine site, and wherein visit information to a publisher site is to be associated with a user registration.

11. The method of claim 1 wherein the user activity history comprises at least one of:
    a number of visits of the computing platform to at least one page of a publisher site;
    an amount of time the computing platform is connected to a publisher web site;

a frequency of visits of the computing platform to at least one page of a publisher site; and an amount of time the computing platform is connected to a publisher web site during a given period.

12. An apparatus comprising:
a network interface to transmit one or more electronic signals to an electronic communication network, or receive the one or more electronic signals from the electronic communication network;
a server system, the server system to:
determine a user score based, at least in part, on a user activity history;
transmit, in response to at least one of the one or more electronic signals,
a message displayable to the user, the message to be presented to the user at least partially in response to the user activity history, the message to present an offer to persistently provide enhanced content to a user at least partially in response to:
a determination that the user score meets or exceeds a threshold value, and
a processing of a first search query related to said enhanced content, the message to prompt the user to accept or decline the offer via one or more user selections, the enhanced content to being determined at least partially in response to identification of a particular item of the one or more search results;
process a received user input responsive to said offer from said user at least partially in response to transmitting said at least one or that one or more electronic signals comprising said message;
transmit signals of at least said enhanced content for display on a client device, at least partially in response to:
receipt of an acceptance of said offer via said user input, and
receipt of a second search query from said user to be related to said enhanced content, said second search query to be received after said receiving of said acceptance of said offer.

13. The apparatus of claim 12 wherein the server system is to modify the user score in response to receipt of a decline of the offer.

14. The apparatus of claim 12 wherein the user activity history comprises visit information of the user to at least one publisher site.

15. The apparatus of claim 14 wherein a beacon is to be placed on the publisher web site to identify visit information and relating it to a user.

16. The apparatus of claim 12 wherein the search query is to be received by a search engine site via the electronic communication network and wherein the visit information is to be maintained on at least one of the search engine site and a site associated with said search engine site.

17. The apparatus of claim 14 wherein the visit information of the at least one user is to be stored on other than the publisher web site and wherein the user information is to be stored as at least a part of a user profile.

18. The apparatus of claim 15 wherein, in response to a visit by the at least one user to the publisher site, a site other than the publisher site is to send a tracking string to the user.

19. The apparatus of claim 12 wherein the user activity history comprises at least one of:
a number of visits of a computing platform to at least one page of a publisher site;
an amount of time the computing platform is connected to a publisher web site;
a frequency of visits of the computing platform to at least one page of a publisher site; and
an amount of time the computing platform is connected to a publisher web site during a given period.

20. An article comprising:
a storage medium comprising machine readable instructions stored thereon which are executable by a computing platform to:
determine a user score based, at least in part, on a user activity history;
initiate transmission of a message displayable to the user at least partially in response to the user activity history, the message to present an offer to persistently provide enhanced content to the user at least partially in response to:
a determination that the user score meets or exceeds a threshold value, and
receipt of a first search query relating to said content, the message to prompt the user to accept or decline the offer via one or more user selections, the enhanced content to be determined at least partially in response to identification of a particular item of the one or more search results;
process a received user input responsive to said offer from said user at least partially in response to transmitting said message; and
initiate transmission of signals of at least said enhanced content for display on a client device, at least partially in response to:
receipt of an acceptance of said offer via said user input, and
receipt of a second search query from said user to be related to said enhanced content, said second search query to be received after said receiving of said acceptance of said offer.

21. The article of claim 20 wherein the user activity history comprises visit information of the user to at least one publisher site.

22. The article of claim 20 wherein the search query is to be received by a search engine site via an electronic computer network and wherein the visit information is to be maintained on at least one of said search engine site and a site associated with said search engine site.

23. The article of claim 20 wherein the user activity history comprises at least one of:
a number of visits of the computing platform to at least one page of a publisher site;
an amount of time the computing platform is connected to a publisher web site;
a frequency of visits of the computing platform to at least one page of a publisher site; and
an amount of time the computing platform is connected to a publisher web site during a given period.

24. A method comprising:
receiving visit information for a user for at least one visit to a publisher web site;
calculating a user score based, at least in part, on a user activity history comprising at least one of:
a number of visits of a computing platform associated with a user to at least one page of a publisher site,
an amount of time the computing platform is connected to a publisher web site,
a frequency of visits of the computing platform to at least one page of a publisher site, and
an amount of time the computing platform is connected to a publisher web site during a given period;

transmitting one or more electronic signals across the electronic communication network to the computing platform, the one or more electronic signals comprising a message to be presented to the user at least partially in response to the user score meeting or exceeding a threshold value, the message to invite the user to accept an offer for persistent enhanced content for the publisher web site, the message to prompt the user to accept or decline the offer via one or more user selections, the enhanced content to be determined at least partially in response to identification of a particular item of one or more search results;

processing a user input received responsive to said offer from said user at least partially in response to transmitting said one or more electronic signals comprising said message; and transmitting signals of at least said enhanced content for display on a client device, at least partially in response to:

receiving an acceptance of said offer via said user input, and receiving a second search query from said user to be related to said enhanced content, said second search query to be received after said receiving of said acceptance of said offer.

* * * * *